United States Patent [19]

Clavin

[11] 4,285,460
[45] Aug. 25, 1981

[54] METHOD AND APPARATUS FOR DOUBLE JOINTING PIPE

[75] Inventor: Edward A. Clavin, Houston, Tex.

[73] Assignee: Midcon Pipeline Equipment Co., Houston, Tex.

[21] Appl. No.: 66,037

[22] Filed: Aug. 13, 1979

[51] Int. Cl.³ ........................ B23K 31/06; B23K 37/04
[52] U.S. Cl. ..................................... 228/212; 228/13; 228/48; 29/33 T; 219/61
[58] Field of Search ................. 228/48, 13, 49 B, 212; 219/60 R, 61; 29/33 T

[56] References Cited

U.S. PATENT DOCUMENTS

| | | | |
|---|---|---|---|
| 908,761 | 1/1909 | Duncan | 228/13 |
| 1,907,702 | 5/1933 | Anderson | 219/61 X |
| 3,020,388 | 2/1962 | Elliott | 219/60 R |
| 3,103,140 | 9/1963 | Connelly | 409/185 X |
| 3,614,077 | 10/1971 | Blackburn et al. | 228/48 X |
| 3,858,026 | 12/1974 | Edwards et al. | 219/61 X |

Primary Examiner—Gil Weidenfeld
Assistant Examiner—K. J. Ramsey
Attorney, Agent, or Firm—Carl B. Fox, Jr.

[57] ABSTRACT

Method and apparatus for double jointing pipe, wherein a first pipe section is moved onto a pipe support roller assembly and moved lengthwise over a boom which carries a pipe clamp and internal welder at its end. A second section of pipe is then moved onto the pipe support roller assembly and moved lengthwise into engagement with the first pipe section. After the first and second pipe sections have been properly aligned and the clamps expanded to hold the pipe sections in welding positions, the pipe sections are rotated simultaneously while both internal and external welds are made simultaneously. A cap weld may also be formed with the pipes clamped as described, or the pipes may be moved to another support roller assembly and the cap weld made while the connected pipe sections are on the second support roller assembly. The methods and apparatus disclosed result in considerable savings as to both the cost of equipment and operating costs.

16 Claims, 7 Drawing Figures

METHOD AND APPARATUS FOR DOUBLE JOINTING PIPE

BACKGROUND OF THE DISCLOSURE

Double jointing of pipe has been a relatively expensive and complicated operation. Since proper and adequate double jointing of pipe requires that an internal weld be formed to join the two pipe sections together, it has been necessary to move both men and equipment into the pipes to perform the internal welding operation. Proper aligning of the pipe sections prior to welding has been a tedious and cumbersome operation, and the moving of welding clamps and internal welding apparatus into the pipes has been arduous and expensive. Movable support apparatus for the clamp and internal welder has been necessary, requiring tracks or other movable supports which occupy considerable space and are relatively expensive. This invention seeks to reduce both the cost of the equipment which is necessary and the number of personnel required to operate the equipment.

SUMMARY OF THE INVENTION

According to the invention, an improved double jointing apparatus and improved methods for operation thereof are provided. An elongate support roller assembly is provided, of a length to simultaneously support two sections of pipe disposed end-to-end. A boom extends over the support roller assembly from one end thereof to approximately the center. A pipe clamp apparatus and an internal welder assembly are supported at the free end of the boom. A first pipe section is delivered laterally onto the other end of the support roller assembly, and then moved over the boom so that its end corresponding to the end of the boom extends over one set of clamp shoes with the pipe section end aligned with the internal welder. A second pipe section is then delivered laterally onto the other end of the support roller assembly and moved to end-to-end relation with the first pipe section, around the second set of clamp shoes, and is then aligned with the first pipe section and clamped into place. The boom is movable longitudinally a limited distance so that the first set of clamp shoes and the internal welder may be properly aligned with the end of the first pipe section prior to movement of the second pipe section into place. An external welder is moved into proper alignment at the exterior of the weld joint or gap, and initial welding is performed simultaneously at the lower interior of the pipes and at the upper exterior of the pipes. Not only does the simultaneous internal-external welding of the pipes eliminate development of unwanted strains at the weld, but also eliminates the necessity of segmental welding both at the interior and exterior of the pipe.

The internal welder may be retracted, and the external welder may be adjusted to perform a cap welding operation at the exteriors of the pipes, or, alternatively, the joined pipe sections may be removed from the aforesaid support roller assembly onto another similar assembly for formation of the cap weld. This latter procedure enables initial joining of another pair of pipe sections while the cap welding operation is carried out, thereby increasing the output of the apparatus.

The providing of the pipe clamp and internal welder at the end of a boom eliminates the necessity of endwise movement of this equipment into the end of one of the pipes. In addition, the necessity for personnel entering the pipes to perform the internal welding operation is eliminated. Time is saved because the internal and external welds are performed simultaneously. According to prior procedures, an external weld is first formed, after which the pipe clamp is removed and the internal welding operation is then performed. According to the invention, the personnel crew of fifteen to twenty operators is reduced to about three to five operators, resulting in a substantial saving in labor costs in addition to the savings in time required according to the older systems and apparatuses.

A principal object of the invention is to provide improved double jointing stations and methods for joining two sections of pipe together end-to-end. Another object of the invention is to provide methods and apparatuses by use of which double jointing of pipe sections is simplified and its costs reduced. A further object of the invention is to provide such methods and apparatuses which are substantially completely automatic in operation. Yet another object of the invention is to provide such methods and apparatus which are entirely dependable and which provide improved welding of pipe sections together in double jointed lengths.

Other objects and advantages of the invention will appear from the following detailed descriptions of the preferred methods and apparatuses, reference being made to the accompanying drawings.

DESCRIPTIONS OF THE PREFERRED EMBODIMENTS

Figure 1:
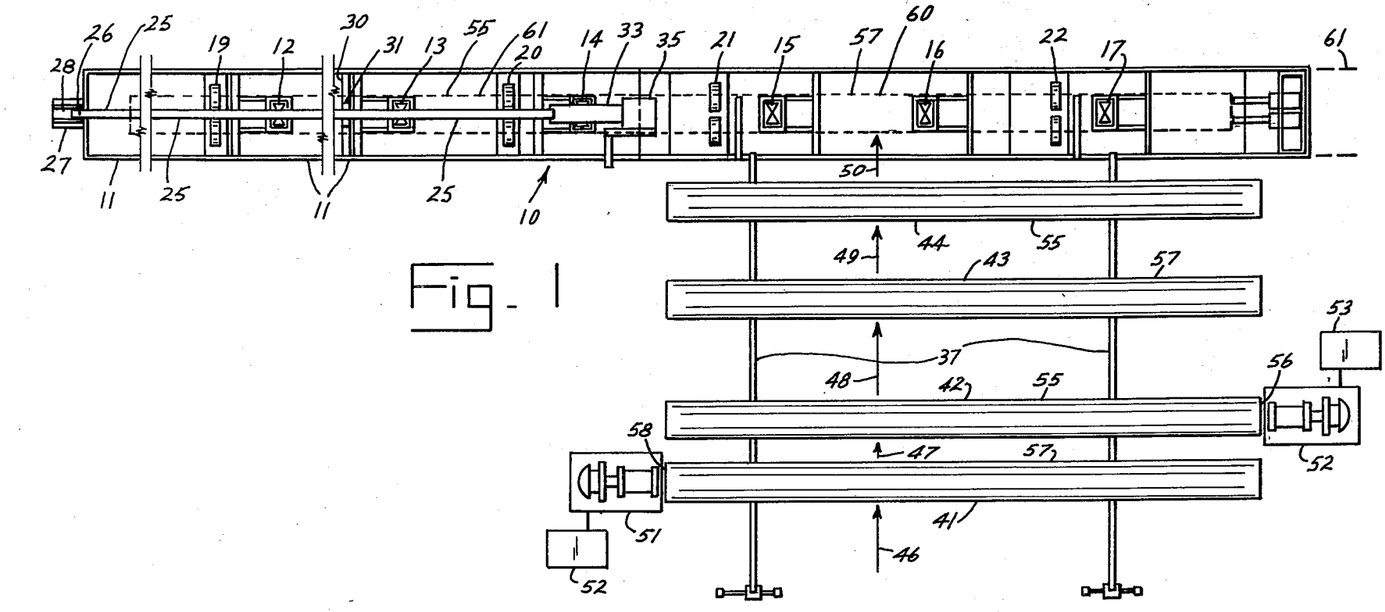
FIG. 1 is a schematic drawing showing the arrangement of a preferred embodiment of apparatus according to the invention, and illustrating the method of the invention.
Figure 1A:
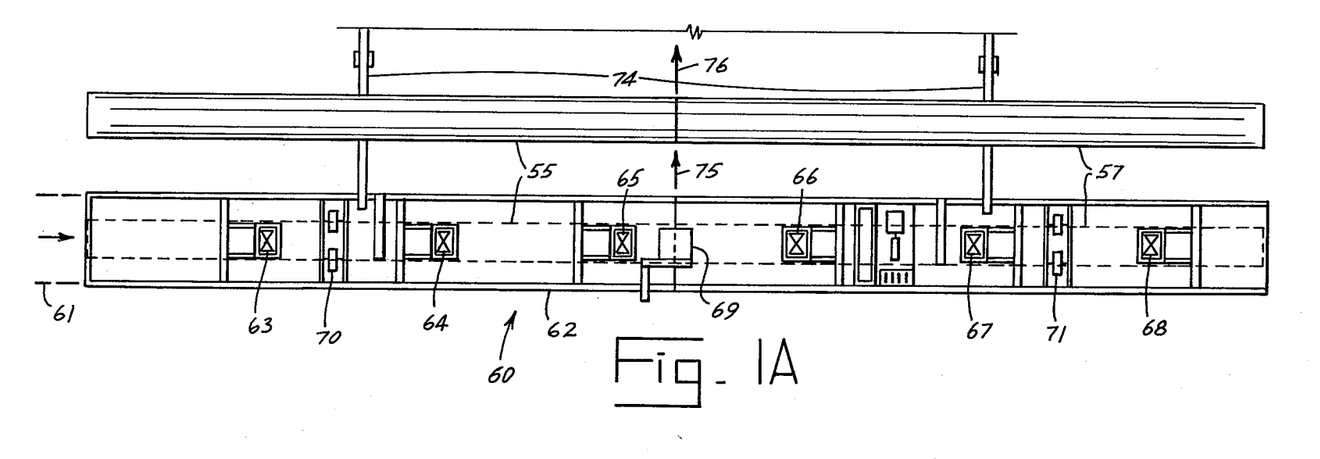
FIG. 1A is a schematic drawing showing the arrangement of apparatus and methods which may be used to form cap welds in conjunction with the apparatus and methods of FIG. 1, and which may be optionally provided.

Referring now to the drawings in detail, and first to FIGS. 1 and 1A, a support roller assembly 10 has supporting frame 11 which supports plural spaced endwise conveying rollers 12–17 and plural spaced turning rollers 19–22. The rollers 12–17 are employed for moving pipe longitudinally of the assembly, and the turning rollers are employed to rotate the pipes. A boom 25 in the form of an elongate vertically disposed plate is supported at its left end 26 by a support 27 fixed to frame 11 and having a hydraulic cylinder 28 capable of moving the boom longitudinally by a limited distance, a foot or two. Endo rollers 12-17 are normally below the level of turning rollers 19-22, but may be elevated to be above the turning rollers. The construction of the roller assemblies is not shown in the drawings, since it is conventional and is well known in the art.

Figure 2:
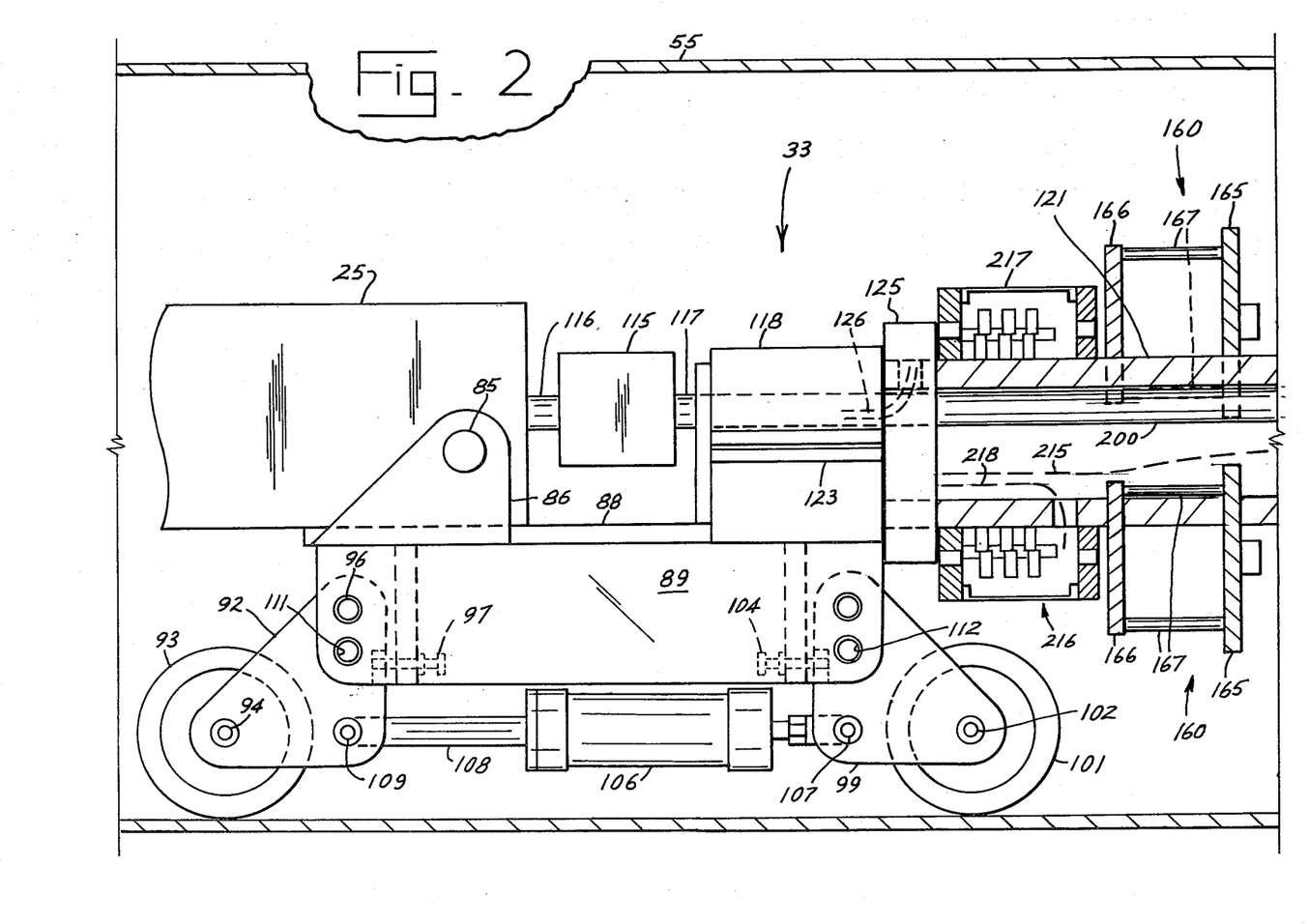
FIG. 2 is a side elevation, partly in vertical cross section, showing a portion of the assembly carried at the end of the boom of the apparatus shown in FIGS. 1 and 1A.
Figure 2A:
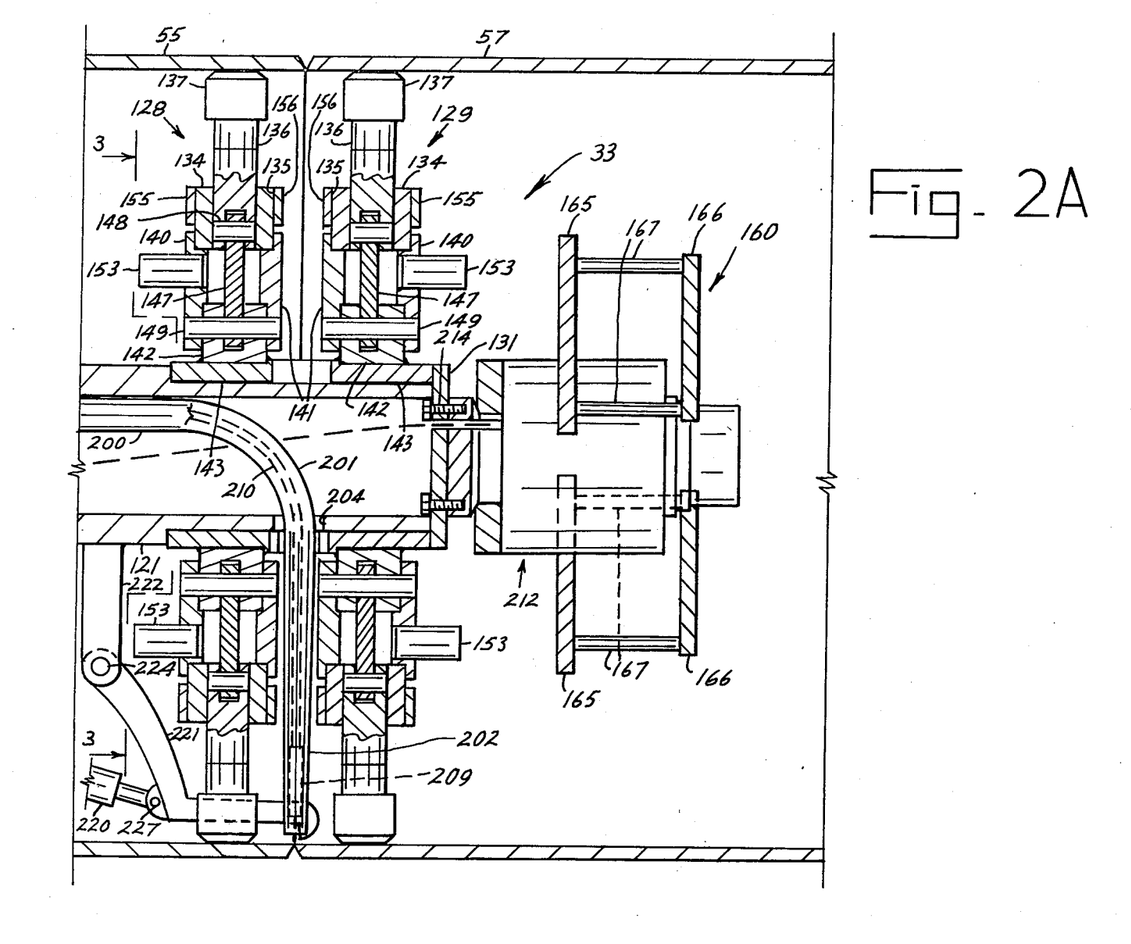
FIG. 2A is a side elevation similar to FIG. 2 showing the remainder of the apparatus carried at the end of the boom.

A retractable boom support assembly 30 is carried by frame 11 near the center of the boom length, and incorporates a hydraulically controlled lifting portion 31 which may be raised to support the boom or lowered to be out of the way of a pipe resting on the rollers. A pipe clamp and internal welding assembly 33, which is not shown completely in FIG. 1 but is shown in FIGS. 2 and 2A, is carried at the free end of the boom.

An external welder 35 is supported above assembly 10, and is movable vertically into and out of welding position with respect to pipes supported by assembly 10. This equipment, too, is conventional and further description is not believed necessary.

A pipe support assembly 37 is provided at one side of the righthand end of assembly 10. Assembly 37 is employed to support pipes prior to their delivery onto support assembly 10 and to deliver the pipes onto assembly 10. The structure of assembly 37 is conventional and well known in the art, and will not be further described.

Assembly 37 has pipe positions 41, 42, 43, 44. At the lefthand end of a pipe in position 41, a pipe end facing assembly 51 powered by power unit 52 faces the left end of each pipe delivered to position 41. An end facing assembly 52 powered by power unit 53 faces the righthand end of each pipe delivered to position 42. Thus, the pipe ends which will be abutted together for welding are faced at positions 41, 42 prior to the time that the pipes are delivered onto roller assembly 10.

By way of example, a first pipe 55 is delivered to position 42 of assembly 37 as indicated by arrows 46, 47, and its righthand end 56 is faced by apparatus 52. A second pipe 57 is delivered to position 41 of assembly 37 and its lefthand end 58 is faced by apparatus 51. Pipes 55, 57 are moved through positions 43, 44 of assembly 37 and then onto assembly 10 as indicated by arrows 48-50. Pipe 55 is first moved to pipe position 60 on assembly 10, following which the rollers 12-17 are elevated to deliver the pipe to position 61 at the lefthand portion of assembly 10, the pipe in moving from position 60 to 61 passing over welding clamp and internal welding assembly 33 and around boom 25. On the passing of the pipe part assembly 33, a switch is actuated which lowers retractable boom support 31 and lowers retractable wheels on the assembly 33. Boom 25 is supported by support 30 until the clamp assembly 33 enters the pipe being moved thereover, after which the boom is supported by the clamp wheels, to be described.

Before pipe 57 is moved to position 60, locator stops carried by clamp assembly 33 are lowered and the boom 25 is moved by cylinder 28 until the locator stops are engaged with the righthand end of pipe 55. The clamp shoes of assembly 33 within the end of pipe 55 are then expanded to the soft clamp mode, with low clamping pressure. The locator stops are then retracted. Next, the second pipe 57 is lowered onto turning rollers 21-22 and, with rollers 15-17 retracted is pushed over the second set of clamp shoes of assembly 33, and the second set of clamp shoes is expanded in the soft expand mode, under low clamping pressure. Next, the set of clamp shoes within the righthand end of pipe 55 are expanded to hard clamping position, with high clamping pressure. The two joints of pipe are then drawn together by a retracting cylinder built into clamp assembly 33, not shown in the drawings but being of conventional design.

If the alignment of the pipes is not perfect at this time, the turning rollers 21 are capable of being moved by hydraulic cylinder controls to align the pipe ends. After the two joints of pipe have been aligned, the clamp shoes within the lefthand end of pipe 57 are changed to the hard mode, with high clamping pressure. The clamp travel wheels are then retracted, and the welding nozzle of assembly 33, to be described later, is automatically lowered into welding position. Next, exterior welding head 35 is lowered to position for exterior welding at the pipe joint.

Next, a weld start switch is actuated, this starting both internal welding and external welding of the pipes at the same time. The internal welding, as will be later explained, is performed at the lower sides of the pipes while the external welding is performed at the upper sides of the pipes. During welding, of course, the pipes are simultaneously rotated so that welding proceeds around the entire peripheries of the pipes, both internally and externally, at the same time. Because of the balanced welding condition, with welding being done at opposite sides of the pipe at the same time, strains in the welds do not develop and superior welds may be achieved. Portions of assembly 33 are rotated with respect to the boom during the welding operation. After the first weld passes, internally and externally, have been completed, the controls are switched to cap weld position, causing retraction of the internal weld nozzle and repositioning of the welding perameters of the external welding head. The cap weld pass is then completed, after which the external welding head is retracted upwardly away from the pipes. Next, the clamp travel wheels are lowered and the clamps are retracted. The rollers 15-17 are then raised to above turning rollers 21-22 and are employed to drive the double jointed pipes off the side of the apparatus longitudinally of assembly 10. Alternatively, the pipes could be removed from assembly 10 laterally of the lengths of the pipes. The apparatus is then returned to start position ready to receive another pipe 55, followed by another pipe 57.

The cap weld may be formed on other equipment, shown in FIG. 1A, if desired, instead of being formed on support assembly 10. Support roller assembly 60 is disposed end-to-end with assembly 10, at the righthand end of assembly 10, as indicated by dashed lines 61 in FIGS. 1 and 1A. Assembly 60 has frame 62 which supports endevise conveying rollers 63-68 end turning rollers 70-71. The double jointed pipes 55, 57, welded together by the initial internal and external weld passes, is moved onto assembly 60 by the rollers 63, 68. Rollers 63, 68 are lowered so that the pipes come to rest on turning rollers 70, 71. External welder 69 is lowered to welding position at the pipe joint, and the pipes are rotated by rollers 70, 71 while completion of the cap weld is accomplished. After the cap weld has been finished, the pipes, now completely double jointed with all welds completed, is rolled laterally of its length onto conveyor support 74 and removed from the double jointing station as indicated by arrows 75, 76.

Referring next to FIGS. 2 and 2A of the drawings, the inner or free end of boom 25 is shown at the lefthand side of FIG. 2. As described earlier, the boom is in the form of a vertically disposed elongate plate or bar. Assembly 33 is shown connected to the inner end of boom 25 by pin 85 disposed through opposite connection flanges 86 forming a yoke within which the end of boom 25 is disposed. A plate 88 is welded between the lower ends of yoke flanges 86. Two angularly downwardly disposed plates 89, only one being shown, are angularly welded to plate 88 whereby they extend angularly downward in mirror image fashion with respect to plate 88, at angles of approximately 32 to 35 degrees away from bottom center at each side. Plate 89 is shown vertically disposed in FIG. 2, but is in actuality in a rotated position disposed angularly outwardly toward the viewer.

At the rear end of each plate 89 there is pivotally connected thereto a generally triangular yoke support 92 wherein which a wheel 93 is supported at axle 94. Yoke 92 pivots at a cross pin 96, a screw adjustment 97 being provided to limit the outward rotation of the yoke and the outward position of the wheel 93. A similar but oppositely turned yoke 99 supports wheel 101 at axle 102. Screw adjustment 104 limits the outward pivotal movement of yoke 99 and the outward position of wheel 101. A hydraulic or pneumatic cylinder 106 is pivotally connected to yoke 99 at 107, shaft 108 of cylinder 106 being pivotally connected to yoke 92 at 109. When cyliner 106 is retracted, the two wheels 93, 101 are pivotally moved outwardly into engagement with the wall of pipe 55. When cylinder 106 is expanded, the wheels are retracted away from the pipe wall. Plates 89 each have additional holes 111, 112 whereby the wheel assembly may be pivotally mounted further outward to accommodate a larger pipe size.

A welding wire feeder 115 is supported by tubular members 116, 117 between the end of boom 25 and a housing 118 carried by plate 88. A tube or pipe 121 is rotatably journaled within housing 118, the upper portion of which is removable by disconnection of bolted flange connection 123. Pipe 121 is rotated by air swivel 125 which is powered by pressured air introduced to the swivel through a tube 126 extending from the left end of the boom. At its end away from swivel 125, pipe 121 is exteriorally reduced and carries clamp assemblies 128, 129 rotatably supported thereon at its reduced portion and retained by end plate 131, which is bolted by bolts not shown to the end of pipe 121. When clamp assemblies 128, 129 are expanded, they become fixed within the pipe within which they are clamped and remain stationary upon rotation of pipe 121.

The clamps 128, 129 operate in accordance with the principals set forth in application for patent Ser. No. 875,289, filed Feb. 6, 1978, now U.S. Pat. No. 4,177,914, issued Dec. 11, 1979. The clamp assemblies are not completely shown in the drawings of this application, and reference may be had to the aforesaid application for further details concerning their structures. Rings 134 of the clamp assemblies are stationary, each having a plurality of radial passageways 135 through which shafts 136 extend. Each shaft 136 has a pipe engaging shoe 137 at its outer end. Rings 140, 141 and 142 are rotatable about pipe 121, as is ring 143 to which ring 142 is affixed by welding. Suitable bearings between pipe 121 and rings 143 may be provided, these not being shown in the drawings. A toggle 147 is connected to each shaft 136 at a pin 148. The opposite end of the toggle is fixed to elements 140, 141, 142 by pin 149. When the rotatable elements 140, 141, 142 are rotated, the toggles cause inward or outward movement of the shafts 136 and clamp shoes 137, depending upon the direction of rotation of the rotative elements. Each element 140 carries a shaft 153 which is affixed to the element 140 by welding and extends axially therefrom. Rings 155, 156 are bolted to rings 134. Each ring 155 has an outwardly extending shaft 157, these being identical with the shafts 153. For each clamp assembly, a pair of drive units 160 are connected each between one stationary shaft 157 and one rotative shaft 153. Only a portion of each drive unit 160 is shown in FIGS. 2 and 2A.

Figure 4:
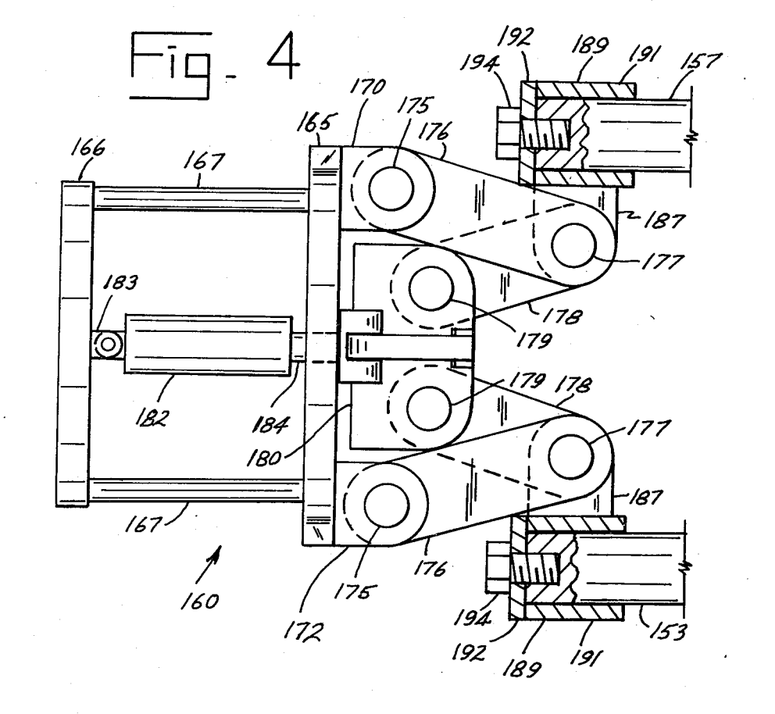
FIG. 4 is a side elevation of a drive unit used in conjunction with the apparatus shown in FIGS. 2, 2A and 3.
Figure 5:
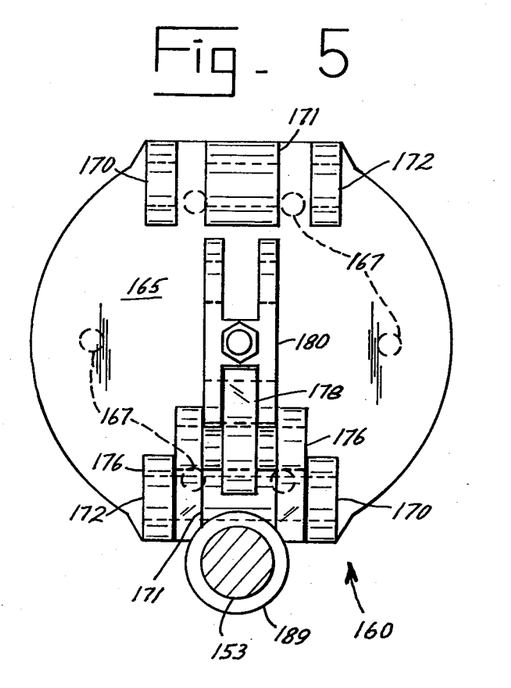
FIG. 5 is an end elevation of the apparatus shown in FIG. 4.

Each drive unit 160 includes a plate 165 to which a second plate 166 is affixed by six circularly spaced shafts 167, only two of which are shown in FIGS. 2, 2A and 4. Each plate 165 has welded thereto bracket elements 170, 171, 172 at opposite sides of the plates. Elements 170-172 have openings therethrough in alignment to receive pins 175 to pivotally support toggle elements 176. Only the lower toggle elements are shown in FIG 5 of the drawings. Toggle elements 176 are connected by pins 177 to toggle elements 178 which are pivotally connected by pins 179 to member 180. A hydraulic or pneumatic cylinder 182 is fixed to plate 166 at bracket 183 and the shaft 184 thereof extends through an opening through the plate 165 to connection with member 180.

Short bars 187 are pivotally connected to pins 177 and each has a socket member 189 fixed to its outer end. Each socket member 189 is formed of a sleeve portion 191 and a circular end plate 192 welded thereto. The end plates 192 have screw openings therethrough through which screws 194 are received to be screwed into the ends of the shafts 153, 157 of the clamp assemblies.

Figure 3:
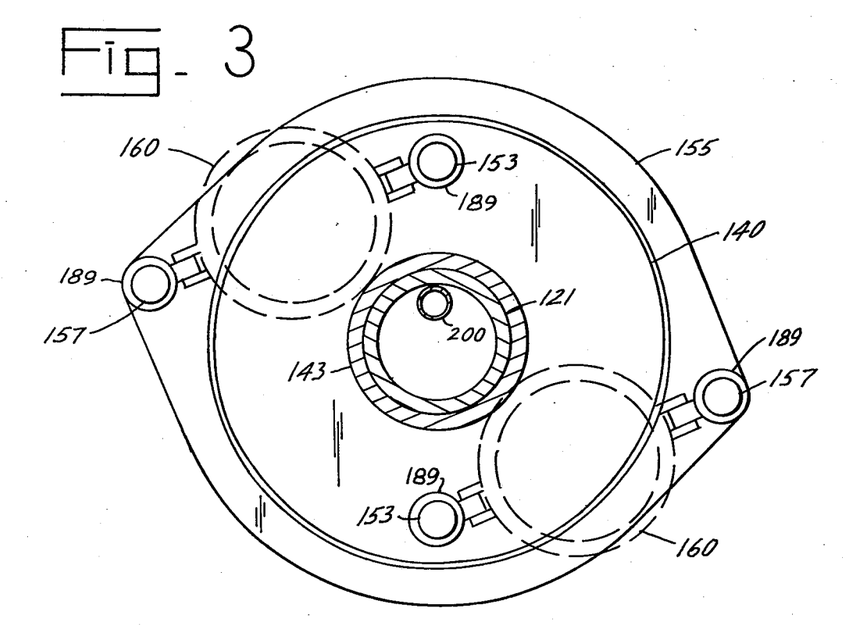
FIG. 3 is a partial transverse cross section taken at line 3—3 of FIG. 2A, this drawing figure not showing all elements of the apparatus and being in part schematic.

Referring to FIGS. 2 and 2A, which together form a complete drawing of the assembly 33, a drive unit 160 is connected between each shaft 153 and a shaft 157 of the clamp assembly. In other words, there are two drive units 160 at the lefthand side of the clamp assembly 128 and there are two drive units 160 at the righthand side of clamp assembly 129. In FIGS. 2 and 2A, only the plates 165, 166 and connecting shafts or bars 167 are shown in order to maintain simplicity in these drawing figures. The locations of the drive units with respect to each clamp assembly are shown in FIG. 3 of the drawings. The drive units 160 are supported only at the shafts 153, 157 to which they are connected, the remainder of the drive unit assemblies being otherwise unsupported.

When the shaft 184 of cylinder 182 is extended, the member 180 of each drive unit 160 is moved away from plate 165, this causing opposite outward movements of each of the members 187 and the socket assemblies fixed thereto. Therefore, extension of shafts 184 causes movement of the connected shafts 153, 157 farther apart, and retraction of shaft 184 causes the respective connected shafts 153, 157 to be moved closer together, thereby enabling operation of the clamp assemblies 128, 129.

Tube 200, which may be a continuation of tube 117, extends through pipe 121 and curves at 201 to a radial direction at 202. Tube 200 extends through an opening 204 through the wall of pipe 121 and between the two clamp assemblies 128, 129. Internal welding torch 209 is carried within the end of tube 200 adjacent the pipe walls. The internal welding torch or nozzle 209 is retractable away from the pipe walls by a positioning cable 210 extending through tube 200 and tubes 116, 117 to exterior control apparatus, not shown.

A slip ring electrical control assembly 212 is connected to end plate 131 by screws 214. A six wire cable 215 extends from control assembly 212 along the boom to a control station. A second slip ring electrical control assembly 216 is fixed around the pipe 121 within housing 217. A power cable 218 extends to slip ring assembly 216 from the control station. Slip ring assembly 212 controls operation of the drive units 160 connected to clamp assembly 129, and slip ring assembly 216 controls operation of the drive units 160 connected to clamp assembly 128. Each drive unit cylinder 182 has a hydraulic fluid conduit (not shown) extending thereto through pipe 121, and supplies of hydraulic fluid to the cylinders are controlled by the respective slip ring assemblies through control of suitable solenoid valves. Therefore, complete operation of assembly 33 may be carried out from the fixed end of boom 25 or any adjacent location desired. Hydraulic fluid conduits also extend along boom 25 to cylinders 106 and 220 from the control station, whereby retraction of wheels 93 and 101 may be controlled from the fixed end of the boom or other adjacent location, and whereby retraction and extension of the locator stops 221 may be accomplished.

The locator stop or stops 221 are each pivotally connected by a pin 224 to a support 222 fixed to pipe 121. A hydraulic cylinder 220 supported at its opposite end by pipe 121 is connected at its shaft end to a stop 221 at a pin 227. The locator stop is retracted by extension of the cylinder and extended by retraction of the cylinder. Each locator stop has a conventional stepped end formation adapted to engage the pipe end to locate the clamp and internal welding assemblies.

The apparatus which has been described amounts to a considerable improvement over the prior art apparatuses. Double jointing of pipes is accomplished by continuously formed internal and external welds, resulting in a saving of welding time and cost. Movement of a welding clamp through the pipes is eliminated, since one of the pipes is, instead, moved to around the clamp supported by a boom. Pipe end alignment is rendered a simple operation. The cost of the equipment is greatly reduced, compared with the cost of conventional equipment.

While preferred embodiments of the methods and apparatus have been described and shown in the drawings, many modifications thereof may be made by a person skilled in the art without departing from the spirit of the invention, and it is intended to protect by Letters Patent all forms of the invention falling within the scope of the following claims.

I claim:

1. Double jointing station apparatus for use in welding two pipe sections together to form a double length pipe section, comprising support means for supporting two pipe sections disposed end-to-end, means for conveying pipe sections lengthwise of said support means in both directions, means for rotatively turning pipe sections disposed on said support means, longitudinal boom means supported at one of its ends at one end of said support means and extending parallely above one end portion of said support means to a central point of said support means whereby a first pipe section placed on the other end portion of said support means may be conveyed lengthwise onto said one end portion of said support means to a position surrounding said boom means, and a second pipe section may be disposed on said other end portion of said support means in end-to-end relation with said first pipe section, internal welding clamp means and internal welding head means carried at the free end of said boom means within the joint between said first and second pipe sections, external welding head means supported outside of said joint between said first and second pipe sections, said welding clamp means including a pair of clamps each expandable and retractable in the end of one of said first and second pipe sections at the opposite sides of said joint and said internal welding head means being disposed between said clamps at said joint, whereby with said clamps expanded said pipe sections may be rotatively turned together and welded simultaneously internally and externally at said joint.

2. The combination of claim 1, said internal welding head means being disposed to form an internal weld at the joint between said pipe sections at the lower side of said joint, and said external welding head means being disposed to simultaneously form an external weld at said joint between said pipe sections at the upper side of said joint.

3. The combination of claim 1, each of said internal and external welding head means being retractable from welding positions with respect to said joint.

4. The combination of claim 3, said means for conveying pipe sections lengthwise of said support means comprising plural linearly spaced endwise conveying rollers at each said end portion of said support means.

5. The combination of claim 4, said means for rotatively turning said pipe sections comprising plural linearly spaced pairs of transversely aligned rollers having their axes disposed lengthwise of said support means at each said end portion of said support means.

6. The combination of claim 5, said rollers being movable to positions above and below said transversely aligned rollers.

7. The combination of claim 6, including conveyor means for conveying pipe sections transversely of their lengths onto said other end portion of said support means.

8. The combination of claim 7, including pipe end finishing means for finishing opposite ends of two pipe sections simultaneously while said pipe sections are on said conveyor means.

9. The combination of claim 8, said clamps of said internal welding clamp means carried at said free end of said boom means comprising a circularly spaced set of clamping shoes disposed at each side of said internal welding head means.

10. The combination of claim 8, said internal welding head means being disposed to form an internal weld at the joint between said pipe sections at the lower side of said joint, and said external welding head means being disposed to simultaneously form an external weld at said joint between said pipe sections at the upper side of said joint.

11. The combination of claim 1, including additional support means having said spaced endwise conveying rollers and having pipe turning rollers and positioned to receive double jointed pipe sections from said first-named support means, and external welding means movable to welding position to form an additional external weld around said joint.

12. Method for double jointing pipe, comprising moving a first pipe section over a longitudinal cantilevered horizontal support having an internal pipe clamp carried at its free end, clamping said first pipe section at one side of said pipe clamp, moving a second pipe section into aligned abutment with said clamped end of said first pipe section and clamping its abutted end at the other side of said pipe clamp, and rotating said pipe sections about their axes while simultaneously forming internal and external welds about the joint therebetween while said pipe sections are being rotated.

13. Method according to claim 12, including simultaneously forming said internal and external welds at opposite sides of said pipe sections.

14. Method according to claim 13, including controlling said pipe movements and weld formations automatically from the exterior of said pipe sections.

15. The combination of claim 1, 4, 9, or 11, including means for locating said first pipe section longitudinally with respect to said internal welding clamp means, whereby said internal and external welding head means are accurately aligned with said joint.

16. Method according to claim 12, 13, or 14, including aligning the end of said first pipe section with respect to said internal pipe clamp to locate said joint in position for both said external and internal welds.

* * * * *